Jan. 12, 1954        A. H. TANGEMANN        2,665,720
              SAWMILL LOG LOADER AND TURNER
Filed May 21, 1951                            4 Sheets-Sheet 1

INVENTOR
Albert H. Tangemann
BY
ATTORNEYS

Jan. 12, 1954

A. H. TANGEMANN 2,665,720

SAWMILL LOG LOADER AND TURNER

Filed May 21, 1951

INVENTOR
Albert H. Tangemann

BY Corbett & Corbett
ATTORNEYS

Jan. 12, 1954

A. H. TANGEMANN 2,665,720

SAWMILL LOG LOADER AND TURNER

Filed May 21, 1951

INVENTOR
Albert H. Tangemann

BY
ATTORNEYS

Jan. 12, 1954  A. H. TANGEMANN  2,665,720
SAWMILL LOG LOADER AND TURNER
Filed May 21, 1951  4 Sheets-Sheet 4

INVENTOR
Albert H. Tangemann
BY
ATTORNEYS

Patented Jan. 12, 1954

2,665,720

UNITED STATES PATENT OFFICE 2,665,720

SAWMILL LOG LOADER AND TURNER

Albert H. Tangemann, Gilroy, Calif., assignor to Be-Ge Manufacturing Co., Gilroy, Calif., a corporation of California Application May 21, 1951, Serial No. 227,369

3 Claims. (Cl. 143—95)

This invention relates in general to sawmill apparatus.

A major object of the present invention is to provide an improved log loader and turner for sawmills; the apparatus being effective to positively and rapidly move a log from the log deck onto the carriage, and thereafter to quickly turn the log on the carriage after the initial side cutting operation and while said carriage stands momentarily in its retracted position.

Another important object of the invention is to provide a novel log loader and turner which is hydraulically actuated; the loading arms and nigger arm being selectively and independently actuated by corresponding power cylinders.

A further object of the invention is to arrange the loading arms, nigger arm, and power cylinders in a novel structural assembly; such arms of the assembly working smoothly but forcefully in response to actuation of the corresponding power cylinders to either initially load or subsequently turn a log.

An additional object of the invention is to provide a log loader and turner which embodies novel rotary skids for aiding in the turning of a log on the carriage; such rotary skids normally being in an out-of-the-way position but readily rotatable by the operator to a position for use.

It is also an object of the invention to provide a log loader and turner which is designed to facilitate manufacture and installation; is of rugged and durable construction; and is capable of long service with a minimum of maintenance or repair.

Still another object of the invention is to provide a log loader and turner which is practical and reliable, yet exceedingly effective for the purpose for which it is designed.

These objects are accomplished by means of such structure and relative arrangement of parts as will fully appear by a perusal of the following specification and claims.

Figure 1:
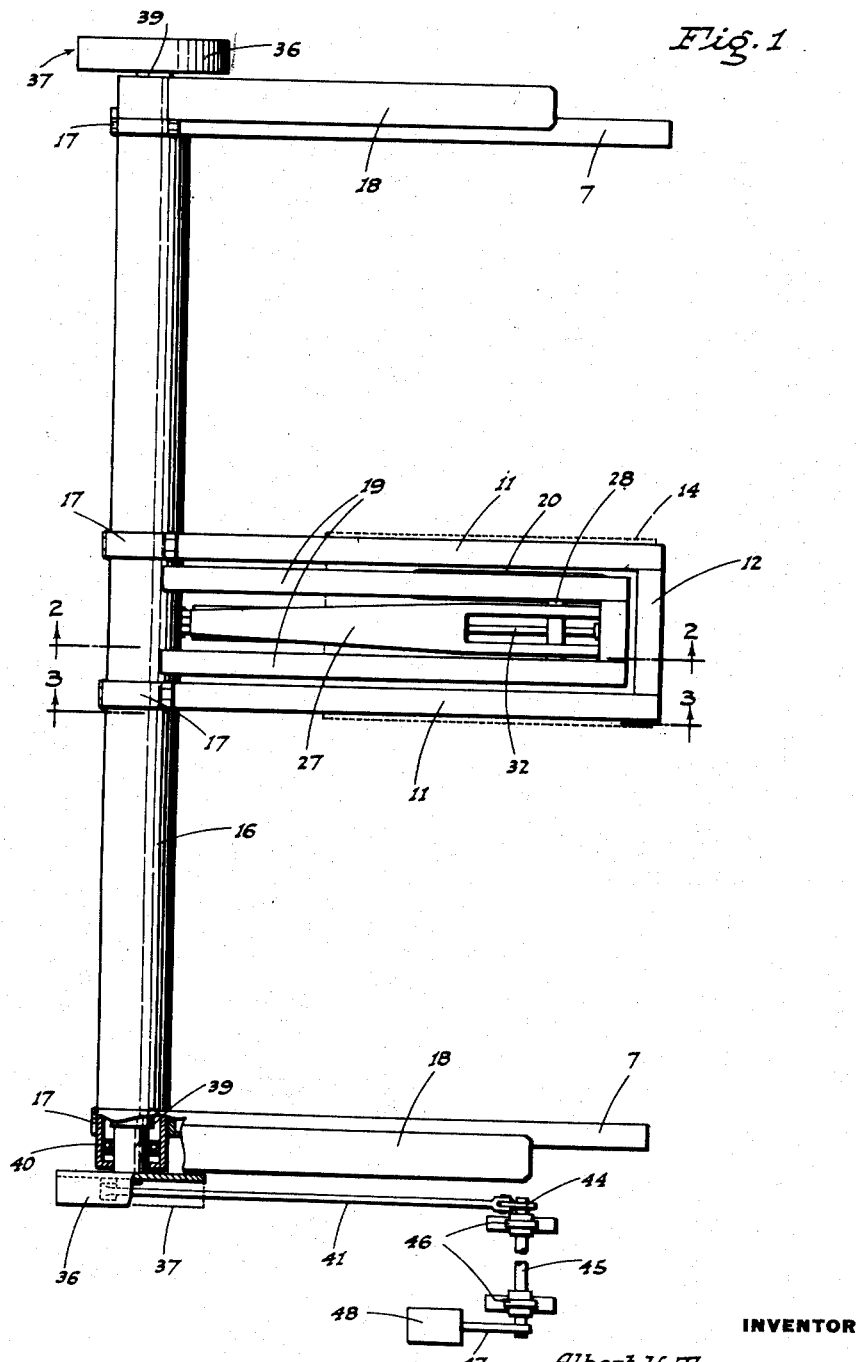
Fig. 1 is a top plan view of the improved log loader and turner.

Referring now more particularly to the characters of reference on the drawings, the improved log loader and turner is adapted for use in connection with the log deck, indicated generally at 1, in a sawmill, wherein said log deck is disposed between a log conveyor or live deck, indicated generally at 2, and a sawmill carriage 3. As usual, the sawmill carriage 3, which alines with the log deck 1 when said carriage is retracted, includes wheels 4 which run on rails 5, whereby the carriage advances a supported log into the saw.

The live deck 2 delivers each log 6 transversely onto the log deck 1; the hereinafter described apparatus—which embodies the present invention—being operative to load such log onto the carriage 3 and to thereafter quarter-turn the log on the carriage when required.

Figure 6:
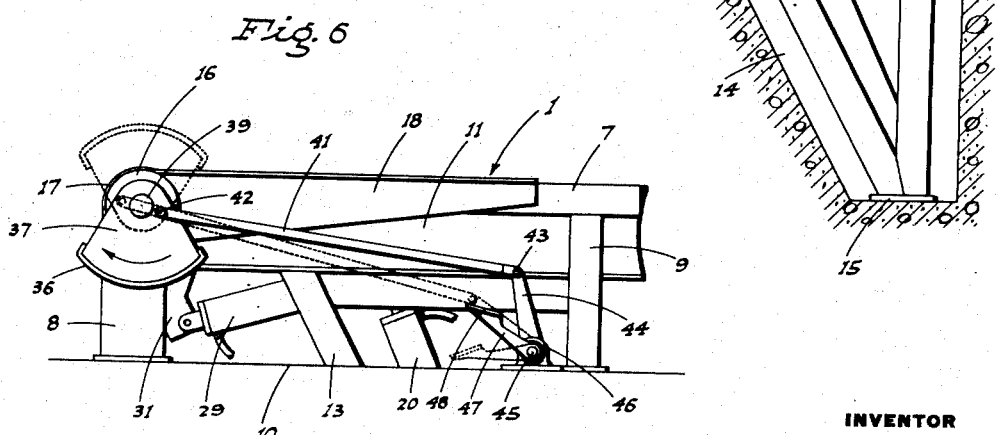
Fig. 6 (Sheet 3) is an end elevation of the apparatus showing particularly the mechanism employed to control the rotary skids.

The log deck 1 comprises horizontal end beams 7 supported on front and rear legs 8 and 9 (Fig. 6), respectively, affixed to the floor 10, and intermediate the end beams 7 there is a pair of horizontal, intermediate beams 11 disposed in the same plane as the end beams 7. The intermediate beams 11 are spaced apart somewhat, and at their rear ends are connected by a cross member 12; the assembly being supported by a pedestal frame 13 which projects downwardly into a pit 14, with the lower end of said pedestal frame affixed to a base plate 15 which rests in the bottom of said pit.

A tubular outside shaft 16, of substantial diameter, extends transversely and horizontally at the front of the log deck 1, being turnably supported by bearing straps 17 at the forward ends of the beams 7 and 11.

Single loader arms 18 are fixed to and radiate from opposite ends of the tubular outside shaft 16, while a pair of other loader arms 19 are fixed to and radiate from the central portion of said shaft 16 in adjacent but spaced relation; the loader arms 18 and 19 being parallel to each other, whereby in one rotary position of the tubular outside shaft 16 all of the loader arms lie substantially flush with the top of the log deck 1. In this position the end loader arms 18 lie along the end beams 7, while the central loader arms 19 lie along the intermediate beams 11.

Figure 2:
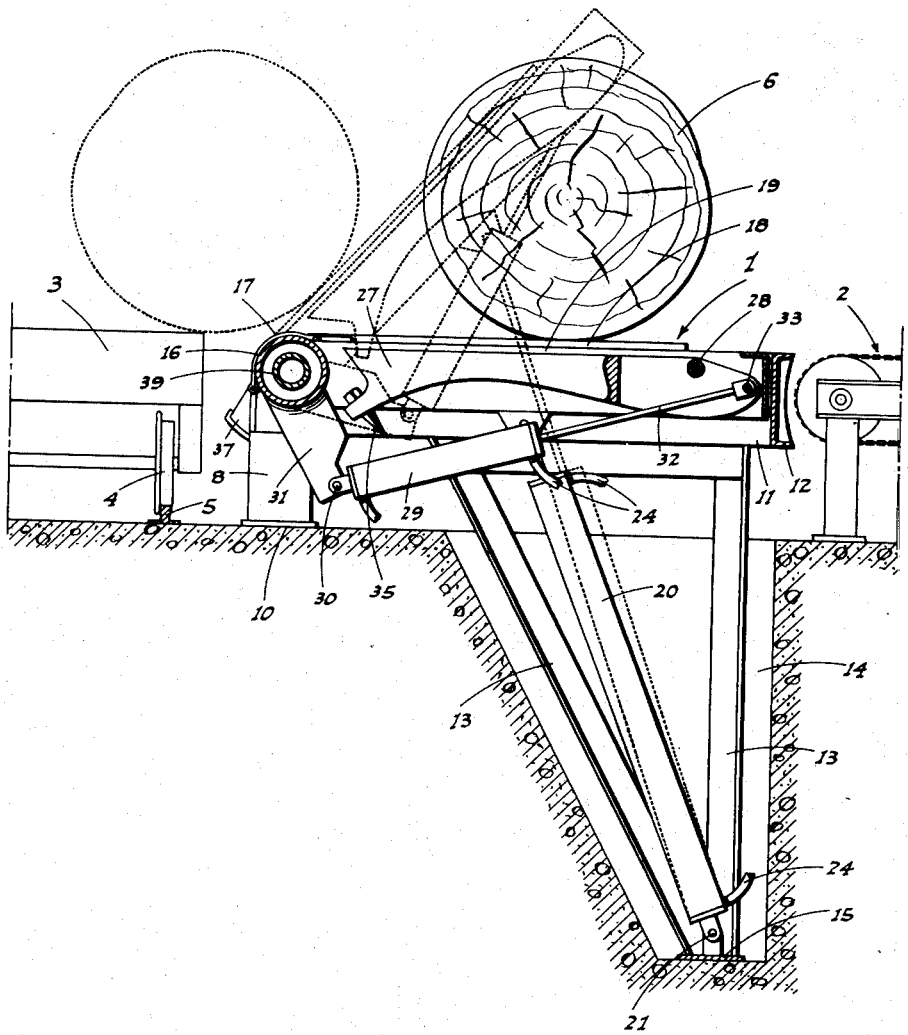
Fig. 2 is a transverse sectional elevation on line 2—2 of Fig. 1, showing the parts of the apparatus in their starting positions in full lines; the loader arms being shown in operative position in dotted lines.

The loader arms 18 and 19 are adapted to be swung upwardly and forwardly as a unit, with the shaft 16 turning about its axis, as follows:

A relatively elongated, double-acting, hydraulic power cylinder 20 is pivoted at its lower end, as at 21, to the base plate 15, and thence projects upwardly in the pit 14 and out of the top of the latter; such power cylinder having an upwardly projecting connecting rod 22 pivoted, as at 23, in connection with the central loader arms 19 on the under side and intermediate their ends. Thus, with actuation and extension of the power cylinder 20, the connecting rod 22 acts to swing the assembly of the loader arms 18 and 19 upwardly and forwardly as a unit, whereby to forcefully shift a log 6 from the log deck 1 onto the sawmill carriage 3. See Fig. 2.

The power cylinder 20 is controlled from an operator's station beyond one end of the log deck 1 by means of a valve-regulated, fluid pressure conduit system, shown only in part, as at 24.

After the log 6, which rests on the carriage 3 against the head blocks 25, has had a side cut 26 made thereon, it is requisite that such log be quarter-turned in a direction to place said side cut at the bottom or flush on the carriage 3.

To accomplish such quarter-turning of the log on the carriage 3, the present apparatus includes the following:

A nigger arm 27 normally lies hidden or out of the way between the central loader arms 19, being pivoted adjacent but short of its rear end, as at 28, in connection with said central loader arms adjacent their free ends.

A separate double-acting, hydraulic power cylinder 29 is pivotally connected at one end, as at 30, to a relatively short radial bracket 31 which normally depends from the tubular outside shaft 16; the connecting rod 32 of cylinder 29 being pivoted at its free end, as at 33, to the nigger arm 27 rearwardly of the pivot 28.

The power cylinder 29 is controlled from the aforesaid operator's station at one end of the log deck 1 by a valve-regulated, fluid pressure conduit system, shown only in part at 34.

The power cylinder 29 is normally extended, but when it is actuated to contract the same, the connecting rod 32 swings the nigger arm 27 about the pivot 28 in a direction such that said arm moves out from between the central loader arms 19.

Figure 3:
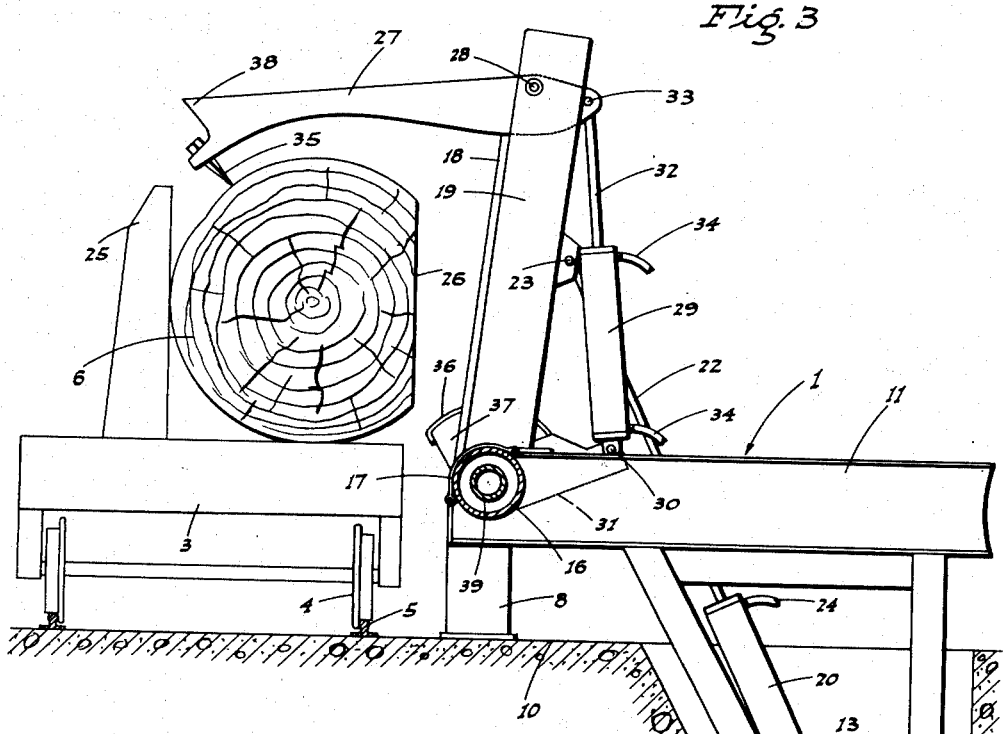
Fig. 3 is a transverse sectional elevation on line 3—3 of Fig. 1, showing the nigger arm as initially engaged with a log on the carriage for the purpose of quarter-turning said log.

When it is desired to quarter-turn the log 6 on the carriage 3, which log has had at least one side cut 27 thereon, the power cylinder 29 is actuated to cause the nigger arm 27 to swing out from between the central loader arms 19, and then the power cylinder 20 is actuated to cause such loader arms to swing to an upwardly projecting position. This positions the nigger arm 27 in overhanging relation to the log 6, whereupon the power cylinder 29 is actuated to extend the same, causing such nigger arm to swing down forcefully at its outer end, penetrating a depending spike 35 into the log some distance beyond the top center. See Fig. 3.

Figure 4:
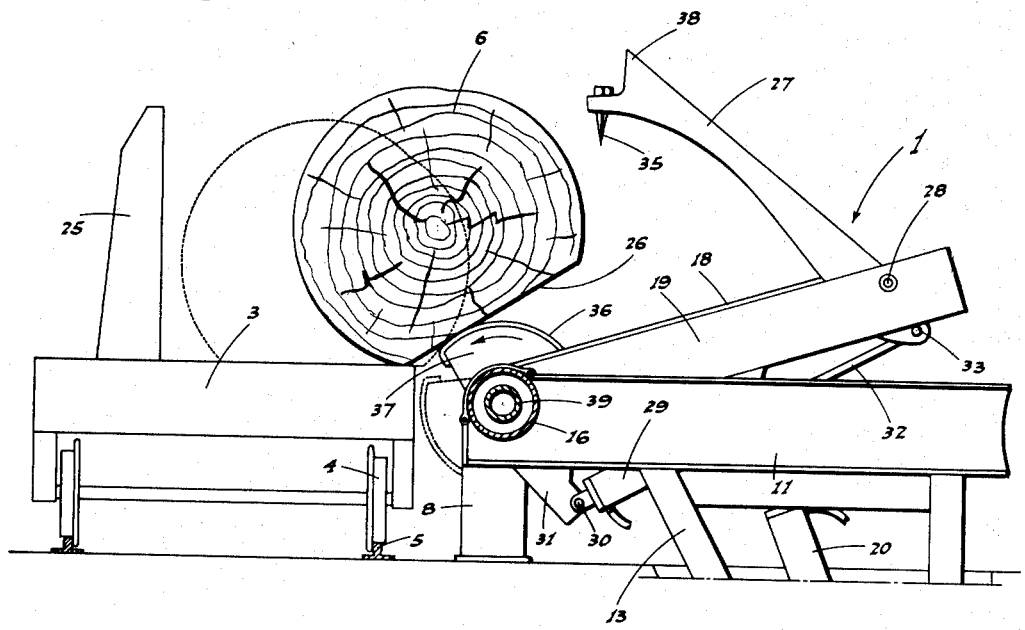
Fig. 4 is a similar view, but shows the loader arms and nigger arm in a pulled-back position to start the quarter-turn of the log; the latter being shown as in engagement with the rotary skids.

After the spike 35 is engaged with the log, the loader arms 19 are swung rearwardly and downwardly by the power cylinder 20, with the result that the nigger arm 27 pulls and part-rotates the log 6 in the direction of the log deck 1. See Fig. 4.

The spike 35 then escapes the log, which at this time is in generally spanning relation between the adjacent portion of the sawmill carriage 3 and the front edge of the log deck 1; the log being supported by the arcuate working faces 36 of then upstanding rotary skids 37 which project above the log deck 1, and which skids are mounted at opposite ends of the tubular outside shaft 16 in the manner as will hereinafter appear.

After the log 6 falls against the upstanding, rotary skids 37, such skids turn forwardly and the log slides back part way onto the carriage 3.

Figure 5:
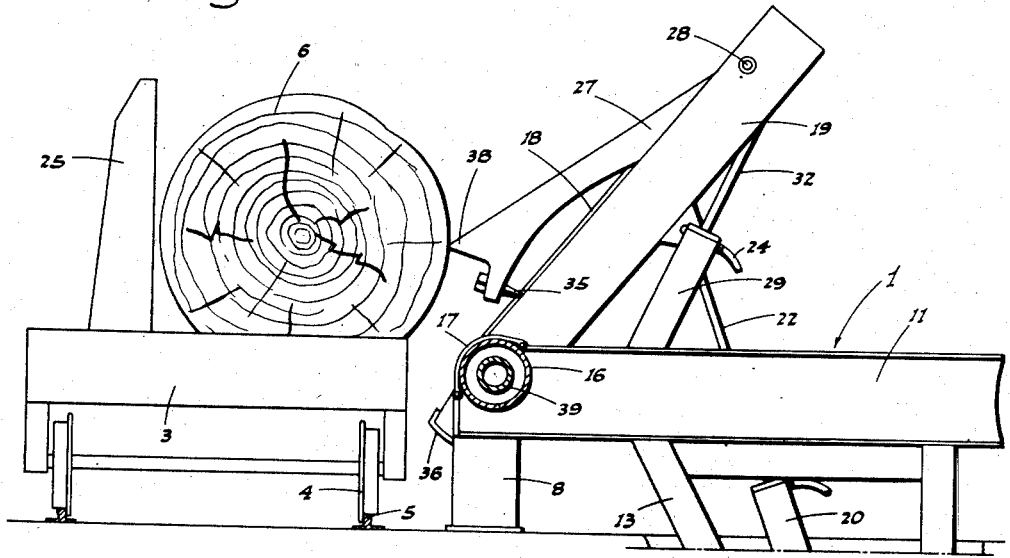
Fig. 5 is a similar view, but illustrates the position of the loader arms and nigger arm when the latter is in said engagement with the already quarter-turned log, for the purpose of urging said log into engagement with the head blocks on the carriage.

However, the log usually does not slide back far enough to rest against the head blocks 25, as required. To so position the log, the nigger arm 27 is swung down so that it is at a relatively sharp forward and downward incline when the central loader arms 19 are set at a corresponding upward and rearward incline, both as shown in Fig. 5. With the parts so adjusted, the central loader arms 19 are swung forwardly by the power cylinder 20, whence a prong 38 on the outer end of the nigger arm 27 opposite the spike 35 bites into the log 6 on the near side, and said log is slid laterally on the carriage 3 until it abuts the head blocks 25.

After the log is thus quarter-turned and repositioned on the carriage, the power cylinders 20 and 29 are actuated to cause the central loader arms 19 and of course the end loader arms 18, together with the nigger arm 27, to return to normal horizontal position substantially flush in the log deck 1, preparatory to the next log handling operation.

The rotary skids 37 are mounted and controlled as follows:

Such rotary skids 37 are segmental and are attached to opposite ends of an inside shaft 39 which extends through the tubular outside shaft, being carried in bearings 40 whereby said inside shaft 39 and the rotary skids 37 are relatively free-turning.

The rotary skids 37 normally depend from the inside shaft 39, but are adapted to be rotated to an upstanding position to catch and skid a log during its turning operation, as previously described.

To half rotate the rotary skids 37 between their normally dependent and their operative upstanding positions, a link 41 (Figs. 1 and 6) extends along one end of the log deck 1, and such link is pivoted at its forward end, as at 42, in eccentric relation to the side of the adjacent rotary skid 37.

At its rear end the link 41 is pivotally connected, as at 43, to the upper end of a radial lever arm 44 fixed on the inner end of a short countershaft 45 carried in journals 46 supported from the floor.

At its outer end the countershaft 45 is fitted with a forwardly projecting lever arm 47 having a foot pedal 48 on its outer end. The foot pedal 48 is disposed immediately adjacent the station from which the operator controls the power cylinders 20 and 29.

By depressing the foot pedal 48, the operator causes the link 41 to thrust forwardly, and this has a cranking effect on the adjacent rotary skid 37, turning it from its dependent position to its upstanding position. At the same time the inside shaft 39 rotates, and the rotary skid 37 at the opposite end makes a similar motion. Thus, each time a log 6 is pulled by the nigger arm 27 from the sawmill carriage 3 toward the log deck to part-turn such log, the rotary skids 37 can be quickly swung up to catch the log on its cut side and to thereafter skid such log back onto the carriage.

With the described log loader and turner, logs can be manipulated positively and forcefully, either to initially load a log from the log deck onto the carriage, or to subsequently turn the log on such carriage; these operations being accomplished quickly by reason of the fact that the power cylinders 20 and 29 act very fast.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A log loader and turner comprising, in connection with a log deck, a pair of transversely spaced but alined loader arms, means securing said arms for unitary swinging motion about an axis extending along the front edge of the log deck, said arms being swingable between a lowered position substantially flat on the log deck and an upstanding position, a nigger arm adjacent and normally extending lengthwise alongside one loader arm and pivoted thereon, for swinging away from the latter to a projecting position, power means operative to selectively and independently swing the unitary loader arms and the nigger arm, log engaging means on the outer end of the latter, transversely spaced rotary skids of segmental form disposed at opposite ends of the loader arm unit, the securing means for the latter being a tubular, transverse shaft journaled in connection with the log deck, another shaft journaled in and extending through the tubular shaft, the rotary skids being fixed to said other shaft at its ends, and means to rotate said other shaft whereby to swing the rotary skids between a dependent non-working position below the top of the log deck and an upwardly extending working position projecting above said deck.

2. A log loader and turner, as in claim 1, in which said last named means includes an actuating link crank connected to one rotary skid, and foot pedal actuated mechanism arranged to shift said link lengthwise.

3. A log loader and turner comprising, in connection with a log deck, a shaft mounted along the front edge of the deck, loader arms fixed on and spaced along the shaft for upward swinging movement from deck level, a nigger arm lying alongside one loader arm, means pivoting the nigger arm adjacent one end on said one loader arm adjacent its outer end, the nigger arm being normally disposed below the log engaging face of said loader arm and extending from its pivot toward the shaft end of said loader arm, a log engaging element on the free end of the nigger arm, and means to swing the nigger arm about its pivot upwardly from said load engaging face of the loader arm; said last named means comprising a bracket fixed on and projecting from the shaft in normally depending relation thereto, and a hydraulic cylinder unit connected between the bracket and the nigger arm at the end thereof opposite its free end.

ALBERT H. TANGEMANN.

References Cited in the file of this patent
UNITED STATES PATENTS

| Number | Name | Date |
|---|---|---|
| 408,760 | Simonson | Aug. 13, 1889 |
| 426,357 | Armstrong | Apr. 22, 1890 |
| 448,592 | Simonson | Mar. 17, 1891 |
| 623,002 | Fitzgerald | Apr. 11, 1899 |
| 702,974 | Leland | June 24, 1902 |
| 933,231 | Cleveland | Sept. 7, 1909 |
| 1,191,609 | Payne | July 18, 1916 |
| 1,436,623 | Lueth | Nov. 21, 1922 |
| 1,493,977 | Hagmaier | May 13, 1924 |
| 2,538,163 | Parks | Jan. 16, 1951 |